(12) United States Patent
Ribas De Amaral et al.

(10) Patent No.: US 12,535,831 B2
(45) Date of Patent: Jan. 27, 2026

(54) VEHICLE MANAGEMENT SYSTEM FOR CONTROLLING AT LEAST ONE FUNCTION OF A VEHICLE

(71) Applicant: Airbus Defence and Space GmbH, Taufkirchen (DE)

(72) Inventors: Janaina Ribas De Amaral, Taufkirchen (DE); Antonio Perez Acal, Taufkirchen (DE); Alasdair Cook, Taufkirchen (DE); Stefan Neumeier, Taufkirchen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 29 days.

(21) Appl. No.: 18/767,328

(22) Filed: Jul. 9, 2024

(65) Prior Publication Data

US 2025/0021108 A1 Jan. 16, 2025

(30) Foreign Application Priority Data

Jul. 11, 2023 (EP) .................................... 23184774

(51) Int. Cl.
*G08G 5/50* (2025.01)
*G05D 1/46* (2024.01)
*G05D 1/617* (2024.01)
*G08G 5/55* (2025.01)
*G08G 5/76* (2025.01)

(52) U.S. Cl.
CPC ............... *G05D 1/619* (2024.01); *G05D 1/46* (2024.01); *G08G 5/50* (2025.01); *G08G 5/55* (2025.01); *G08G 5/76* (2025.01)

(58) Field of Classification Search
CPC ............ G05D 1/619; G05D 1/46; G08G 5/76; G08G 5/55; G08G 5/50
See application file for complete search history.

(56) References Cited

U.S. PATENT DOCUMENTS

| 2006/0142903 A1 | 6/2006 | Padan |
| 2007/0034071 A1 | 2/2007 | Greene |
| 2016/0068267 A1 | 3/2016 | Liu et al. |

FOREIGN PATENT DOCUMENTS

| CN | 116045734 A | 5/2023 |
| WO | 2018/117872 A1 | 6/2018 |

OTHER PUBLICATIONS

Extended European Search Report including Written Opinion for Application No. 23383326.8 dated May 24, 2024. 18 pgs.
(Continued)

*Primary Examiner* — Mathew Franklin Gordon
(74) *Attorney, Agent, or Firm* — Lerner David LLP

(57) ABSTRACT

A vehicle management system includes a missile avoidance system that generates command for controlling at least one function of a vehicle. The missile avoidance system includes a maneuver control unit and a missile avoidance management unit. The maneuver control unit includes at least two control models. Each of the at least two control models generates the command for controlling the at least one function of the vehicle, and each of the at least two control models can be selectively put in an active state or an inactive state. The missile avoidance management unit selects one of the at least two control models and putts it in the active state. The maneuver control unit outputs the command for controlling the at least one function of the vehicle provided by the control model that is in the active state.

11 Claims, 2 Drawing Sheets

(56) References Cited

OTHER PUBLICATIONS

Extended European Search Report including Written Opinion for Application No. 23184774.0 dated Jan. 4, 2024. 18 pgs.
Neumeier, S. et al., "Apparatus Management System For Controlling At Least One Function Of An Apparatus", co-pending U.S. Appl. No. 18/767,300, filed Jul. 9, 2024.

VEHICLE MANAGEMENT SYSTEM FOR CONTROLLING AT LEAST ONE FUNCTION OF A VEHICLE

FIELD OF THE INVENTION

The description relates to controlling a vehicle with an at least partly automated vehicle management system. In particular, the description relates to a vehicle management system and an aircraft with such a vehicle management system.

BACKGROUND OF THE INVENTION

Partly automated or fully automated systems are used in vehicles to assist an operator of the vehicle in controlling the movement of the vehicle or another function of the vehicle. These partly or fully automated systems may be referred to as operator assistance systems and may control the vehicle or a function thereof automatically or may provide control information to the operator who then controls the vehicle or the function thereof based on the provided control information.

Artificial intelligence techniques are used in such operator assistance systems. For example, CN 11 367 1825 A describes a decision-making missile avoidance method based on reinforcement learning. Neural networks that are trained in accordance with the principles of reinforcement learning are used to guide an aircraft in missile avoidance maneuvers. As another example, US 10 558 809 B1 describes a software assurance system for runtime environments with a runtime monitoring system.

BRIEF SUMMARY OF THE INVENTION

An aspect related to an improved vehicle management system which increases the reliability of artificial intelligence supported vehicle control mechanisms.

According to an aspect, a vehicle management system for controlling at least one function of a vehicle is provided. The vehicle management system comprises a missile avoidance system that is configured for generating a command for controlling the at least one function of the vehicle. The missile avoidance system comprises a maneuver control unit and a missile avoidance management unit. The maneuver control unit comprises at least two control models, namely a first control model and a second control model, wherein each of the at least two control models is configured for generating the command for controlling the at least one function of the vehicle, and each of the at least two control models can be selectively put in an active state or an inactive state. The missile avoidance management unit is configured for selecting one of the at least two control models and putting it in the active state. The maneuver control unit is configured to output the command for controlling the at least one function of the vehicle provided by the control model that is in the active state.

The at least one function of the vehicle that is controlled by the vehicle management system may relate to the movement of the vehicle (determining one or more movement commands, resulting in a movement trajectory) or to another function of a system or a subsystem of the vehicle.

The maneuver control unit includes two or more control models. The control models are provided with input data relating to the vehicle and the vehicles surroundings sensed by sensors (Radar, Lidar, optical cameras, Infrared sensors, acoustic sensors, to name just a few as an example and without limitation) and/or received via a communication interface from an external entity (for example, from an external sensor platform that performs surveillance and provides the surveillance results to consumers, for example via wireless data links). The control models are configured to generate a control command for the vehicle or a system/subsystem of the vehicle based on the received input data.

The input data are then provided to one or more of the control models of the maneuver control unit. The control models may operate in parallel and each determines a control command based on the received input data. However, typically only one of the control models is selected to actually control the vehicle or a system/subsystem of the vehicle based on the control command of the selected control model. This is preferably done by transmitting or forwarding the control command of the selected control model (i.e., of the active control model) to the vehicle or to the controlled system/subsystem. Alternatively, the inactive control models (i.e., the control model(s) that is/are not selected for controlling the vehicle or a system/subsystem) may not be provided with input data such that only the selected (active) control model receives input data and, as a result thereof, generates and provides a control command.

In other words, the missile avoidance management unit selects one of the control models of the maneuver control unit to be put in the active state. When the control model is in the active state, this control model outputs a command, and this command is used for controlling the function of the vehicle. When a control model is in the inactive state, it may be idle or paused. Alternatively, even when in the inactive state, a control model may be provided with input data and may calculate a command. However, the command of a control model that is in an inactive state is not output by the missile avoidance system. Thus, in a certain situation, only one control model is active and the command from this active control model is used to command the function of the vehicle while a command from an inactive control model is ignored.

According to an embodiment, the missile avoidance management unit is configured for selecting the one of the at least two control models and putting it in the active state based on input data including at least one or all of sensor data indicative of a state of the vehicle, missile data indicative of a missile approaching the vehicle, other vehicle state data indicative of a state of third vehicles in the surroundings of the vehicle.

These data may be collected and concatenated by an information collection unit that is configured for collecting relevant information about the vehicle itself, an approaching missile, and other allied vehicles that may be involved in the countermeasures against the approaching missile, or a ground, air or space based surveillance system or a satellite.

The information collection unit receives data and provides input data based on which one of the at least two control models of the maneuver control unit is activated by the missile avoidance management unit.

According to a further embodiment, each control model of the at least two control models is a machine learning model configured for different use cases.

For example, the control models may be trained for different scenarios, constraints, mission parameters of the vehicle, and/or different functions of the vehicle to be controlled by the control models. The machine learning model may be a neural network that is trained under certain conditions, or any other artificial intelligence technique, including expert systems.

According to a further embodiment, each control model of the at least two control models is trained based on different operating conditions of the vehicle.

Thus, multiple control models are provided and each of the control models is trained under certain operating conditions (including information relating to an approaching missile). The missile avoidance management unit determines the current operating conditions of the vehicle and selects one (or more) control models that are trained under operating conditions matching the current operating conditions or being close to the current operating conditions. Thus, the reliability of the commands created by the selected control models is increased.

According to a further embodiment, the operating conditions are defined by at least one of weather conditions, altitude ranges of the vehicle, maneuver capabilities of the vehicle, missile types, available countermeasures of the vehicle, and/or speed ranges of the vehicle.

It is noted that the entries of this list are provided as examples only and not limiting. Other operating condition parameters may be selected to train the control models.

According to a further embodiment, the command for controlling the at least one function of the vehicle is a command for controlling movement of the vehicle and/or a countermeasure deployment trigger.

According to a further embodiment, at least one of the at least two control models includes more than one neural network, each of the neural networks being configured to generate commands for controlling different functions of the vehicle.

Thus, each control model may include different neural networks that are configured for controlling multiple different functions of the vehicle. These neural networks may be trained based on different input data.

According to a further embodiment, the vehicle management system further comprises a monitoring unit, wherein the monitoring unit is configured to monitor the input data and determine if the selected one of the at least two control models fits to the input data.

The monitoring unit makes sure that the selected control model is appropriate for the currently applicable input data. When the parameters of the vehicle mission changes, this change may require a change of the selected and active control model. When the monitoring unit determines that the current input data do not fit to the mission criteria the selected control model is selected for, the monitoring unit sends a signal to the missile avoidance management unit which initiates a change of a control method (e.g., initiates a recovery maneuver or selects another control model).

The monitoring unit may be a separate functional module, like a software module, or it may be implemented as a function of the vehicle management system.

According to a further embodiment, the vehicle management system further comprises a data recording unit, wherein the data recording unit is configured to record input data provided to the maneuver control unit, and output data provided by the maneuver control unit.

The data recording unit collects data about the vehicle, sensor data, mission scenario, other aircraft states, and/or missile data (input data) and the control commands generated and provided by the maneuver control unit (output data). Based on the data recorded by the data recording unit, it may be determined after a mission if the control models have worked appropriately or if the require reconfiguration or modification.

According to another aspect, an aircraft is provided that comprises a vehicle management system as described above and hereinafter.

While, in this aspect, the vehicle management system is described for usage in an aircraft, it may be noted that this is a non-limiting use case. The vehicle management system may be used in spacecraft, watercraft, submarine vessels, or land vehicles.

According to an embodiment, the aircraft further comprises at least one sensor, wherein the sensor is communicatively coupled to the vehicle management system and configured to provide sensor data.

Thus, the vehicle management system receives input data from the at least one sensor for generating the control command. The aircraft may further comprise an antenna or another wireless data transmission interface to receive input data from an external entity which are also used as input data by the vehicle management system.

BRIEF DESCRIPTION OF THE DRAWINGS

The subject matter will hereinafter be described in conjunction with the following drawing figures, wherein like numerals denote like elements, and wherein.

DETAILED DESCRIPTION

Figure 1:
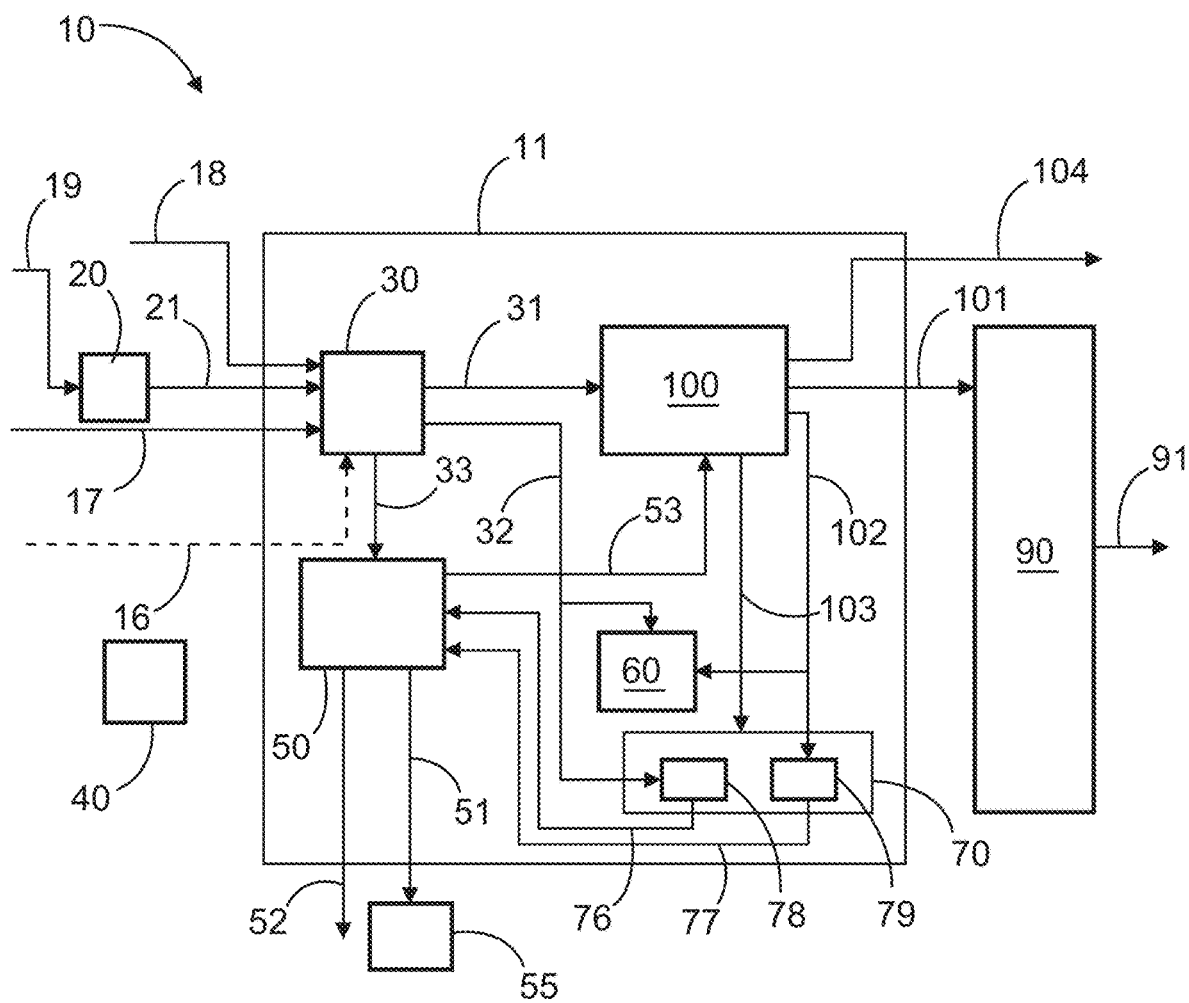
FIG. 1 is a schematic representation of a vehicle management system.

The following detailed description is merely exemplary in nature and is not intended to limit the invention and uses of the invention. Furthermore, there is no intention to be bound by any theory presented in the preceding background or the following detailed description.

The representations and illustrations in the drawings are schematic and not to scale. Like numerals denote like elements.

A greater understanding of the described subject matter may be obtained through a review of the illustrations together with a review of the detailed description that follows.

FIG. 1 shows a vehicle management system 10. The vehicle management system 10 comprises a missile avoidance system 11, a vehicle state provisioning unit 20 and a sensor input provisioning unit 40. For example, the sensor input provisioning unit 40 may receive input data from other sensors and provide those to the missile avoidance system 11.

The missile avoidance system 11 receives data and determines a control command that is transmitted to a flight control system 90 of an aircraft. The flight control system 90 generates commands 91 and transmits the commands 91 to the respective units of the aircraft. Furthermore, the missile avoidance system 11 may output warning signals to a warning system 55 or an availability status 52 that indicates the status of the missile avoidance system 11.

The missile avoidance system 11 comprises an information collection unit 30, a maneuver control unit 100, a missile avoidance management unit 50, a data recording unit 60, and a monitoring unit 70.

Based on several information (for example, countermeasure data 16, missile data 17, other aircraft states 18, sensor data 19) provided directly to the missile avoidance system 11 or to the vehicle state provisioning unit 20 and then provided to the missile avoidance system 11, the information collection unit 30 generates input data 31. The input data 31 are created by fusing the indicated information and are then sent to the maneuver control unit 100. Furthermore, the input data are transmitted to the missile avoidance management unit 50 (indicated by arrow 33), to the data recording unit 60, and to the monitoring unit 70 (indicated by arrow 32).

The maneuver control unit 100 receives the input data 31 and provides those to the control models (see FIG. 2) to generate a command signal 101 and optionally a countermeasure deployment trigger 104. The generated command signal is also transmitted to the monitoring unit 70 and to the data recording unit 60 (indicated by arrow 102).

The missile avoidance management unit 50 determines, based on the input data 33, which of the control models of the maneuver control unit to select for putting into the active state. The control models may be prepared and trained for different use cases. Depending on the input data, the missile avoidance management unit 50 selects the most appropriate control model which is prepared or trained for the current mission scenario. The control model is selected by a selection signal 53 transmitted by the missile avoidance management unit 50 to the maneuver control unit 100. The maneuver control unit 100 sends information about the selected control model to the monitoring unit 70 via signal 103.

The data recording unit 60 receives input data 32 and output data 102 and stores the data in a memory.

The monitoring unit 70 comprises an input monitoring unit 78 and an output monitoring unit 79. The input monitoring unit 78 receives the input data 32 and the output monitoring unit 79 receives the output data 103. Furthermore, the monitoring unit 70 receives a signal 103 indicative of the selected control model. The data of the input monitoring unit 78 and the output monitoring unit 79, i.e., information about availability status and warning based on the monitoring of inputs and outputs, are forwarded to the missile avoidance management unit 50 via signals 76, 77.

The monitoring unit 70 monitors the input to the control models and the output of the control models. Furthermore, the monitoring unit 70 knows which control model is selected. Thus, the monitoring unit 70 is able to make sure that the appropriate control model is selected, i.e., that a control model is selected that is prepared and/or trained for the current mission scenario. Based on the data provided by the monitoring unit 70 to the missile avoidance management unit 50 and based on the input data 31/32/33, the latter may change the selected control model or initiate a recovery maneuver. The missile avoidance management unit 50 selects a control model so that each control model acts within an operational design domain (e.g., altitude, weather, type of missile, aircraft state) it is designed for. The monitoring unit 70 is able to identify if the parameters change in a manner that the selected control model is not designed for.

Figure 2:
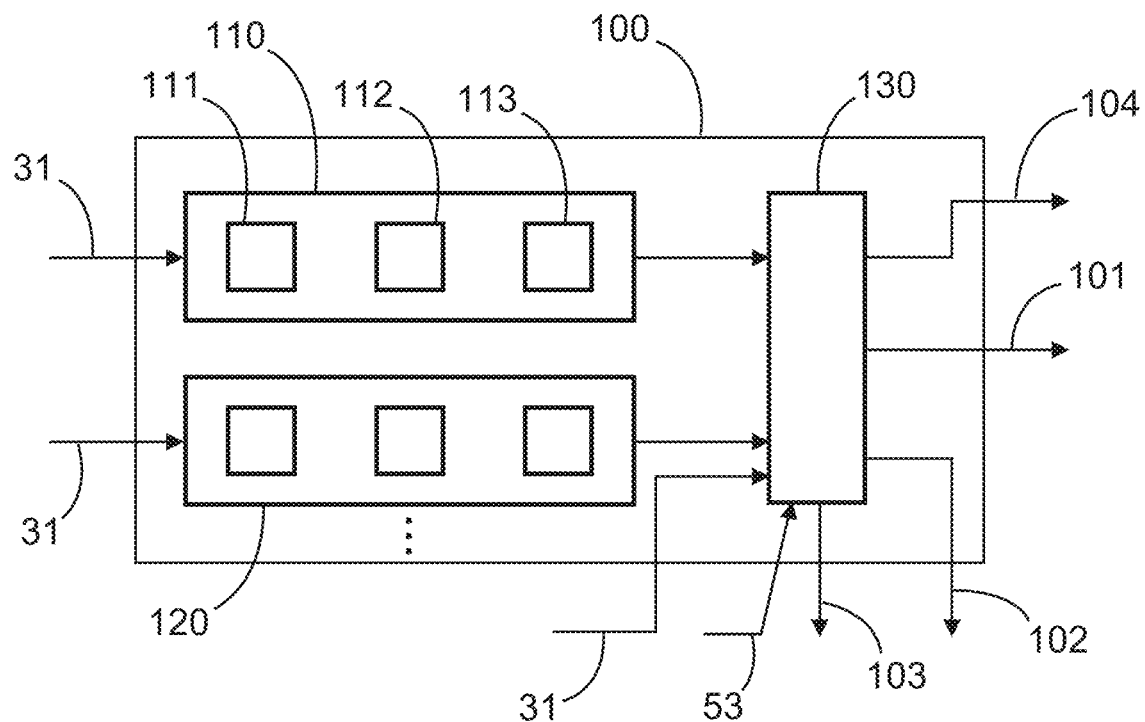
FIG. 2 is a schematic representation of a maneuver control unit of the vehicle management system of FIG. 1.

The structure of the maneuver control unit 100 is shown in FIG. 2. The maneuver control unit 100 comprises at least two control models, shown as first control model 110 and second control model 120. In regards of their basic structure, the control models may be similar or identical to one another. Each control model 110, 120 comprises a preprocessing unit 111, a machine learning model 112, and a post-processing unit 113. In one example that is not shown, the control model may comprise more than one machine learning model to generate more than one control command for different functions of the vehicle.

As can be seen in FIG. 2, the control models 110, 120 receive the input data 31. The input data is pre-processed by the pre-processing unit 111 and forwarded to the machine learning model 112. The result of the machine learning model 112 is post-processed by the post-processing unit 113. The maneuver control unit 100 comprises a control model selection unit 130. The control model selection unit 130 receives the input data 31, the control signal 53 from the missile avoidance management unit 50, and the output from the different control models. Based thereon, the control model selection unit 130 selects the output of one of the control models and forwards this output as signal 101 to the flight control system 90. Additionally, a countermeasure deployment trigger 104 may optionally be output by the control model selection unit 130. Furthermore, the control model selection unit 130 sends signals 102, 103 to the monitoring unit 70.

In other words and with reference to a specific implementation example, the functioning of the vehicle management system 10 described with reference to FIG. 1 and FIG. 2 may be described as follows:

The control models 110, 120 receive input data 31 (aircraft state, sensor data, missile information, etc.) and generate output signals that are used as a basis for generating movement commands (change direction, velocity, etc.), for example by a flight control system 90, and/or countermeasures, for example by a respective defensive aids system. The vehicle management system 10 can be used in vehicles like aircraft or remote carrier that are required to avoid missiles during a mission. It allows manned and unmanned vehicles to perform missile avoidance maneuvers and deploy countermeasures automatically in individual or cooperative way by involving and communicating with third vehicles. The monitoring unit 70 and the data recording unit 60 make sure that the actions of the vehicle management system 10 are monitored and stored to identify if the appropriate control model is selected and if the selected control model operates appropriately.

By using multiple differently configured control models and selecting one control model based on the current mission status (sensor data, missile information, aircraft status, etc.), the probability of mission success can be increased.

The artificial intelligence (AI) based missile avoidance system 10 is responsible for generating commands (e.g., stick commands, countermeasures deployment trigger) using machine learning (ML) models 112 that will guide the aircraft 1 during automatic missile avoidance maneuvers and control the deployment of countermeasures. In order to achieve the most successful evasion, the use of multiple ML models 112 that fit individual conditions (e.g., missile type, aircraft state) can be beneficial. This system 10 can generate only the commands to the flight control system (FCS) 90 to perform kinetic avoidance by affecting the movement trajectory of the vehicle (option 1) or generate the commands to the FCS 90 and the trigger to deploy countermeasures (option 2). Option 2 allows the aircraft to maneuver in such a way that the effectiveness of chaffs or flares are optimized. In this case, the system shall decide depending on missile characteristics, environmental conditions (dust, fog, day/night, etc.), aircraft state and other inputs what to do, which countermeasure shall be triggered and when, which maneuver to execute before, during and after countermeasure deployment, and what to do afterwards.

Therefore, the system 10 can consist of the following subsystems or units:

(1) missile avoidance management subsystem 50 that decides if the automatic maneuver can be started or should end. It also sends information to other systems indicating whether the automatic maneuver can be started and if it will end (e.g., signals 51, 52, cockpit instrumentation or ground station instrumentation and warning system). The ML model selection, i.e., the selection of the best suitable ML model 112 (e.g., based on missile type, aircraft state, etc.), can be performed in this subsystem;

(2) maneuver controlling subsystem 100 with the capability to maneuver the aircraft (option 1) or maneuver the aircraft and initiate countermeasures (option 2), which contains the ML models 112 (e.g., neural networks) and their data pre-processing units 111 and post-processing units 113 that calculate the commands sent to the FCS 90 and the trigger to deploy countermeasures (option 2). The ML model selection can be performed in this subsystem by the control model selection unit 130;

(3) ML monitoring subsystem 70, which monitors the ML models' 112 inputs and outputs;

(4) ML data recording subsystem 60 that records the ML models' 112 inputs and outputs;

(5) collecting relevant information subsystem 30 that receives the aircraft states, information about the missiles (e.g., from a missile warner system, on-board sensor or from any other external source via datalink (e.g., from a missile warner system located on another platform), radio, optical systems, etc.), information about other aircraft (e.g. position and speed that can be estimated using sensor data or shared via datalink), and the information about the countermeasures (which types are available, number of countermeasures available, etc.) and prepares the relevant information to be sent to the maneuver controlling subsystem 100 in accordance with option 1 or option 2 referred to above.

Since the beginning of the flight, the collecting relevant information subsystem 30 will handle the aircraft states, information about missiles and other aircraft and optionally information about countermeasures. This subsystem 30 will send the relevant data such as speed, angle of attack, etc., which will be the input to the ML models 112, to the maneuver controlling subsystem 100, ML monitoring subsystem 70, and ML data recording subsystem 60. In addition, it will inform the missile avoidance management subsystem 50 when a missile is tracking the aircraft.

Once one or more missiles are launched and are tracking the aircraft, the ML monitoring subsystem 70 will identify if the inputs are inside the operational design domain (ODD) of the AI-based missile avoidance system 11. This information is sent to the missile avoidance management subsystem 50 which will allow the automatic missile avoidance maneuver to be started and will send an availability status to another system (e.g., cockpit instrumentation or ground station instrumentation, like system 55), in case the inputs are inside the ODD. Otherwise, it will send an unavailability status informing that the automatic maneuver cannot be started.

The maneuver controlling subsystem 100 can contain one or multiple ML models 112 within control models 110, 120. The ML models may consist of one or more elements. For instance, it could contain one neural network or a more complex architecture with several neural networks. For example, if one ML model is not able to perform successfully the avoidance over the whole safe flight envelope, different ML models can be used in different regions or with different types of missiles or countermeasures. Therefore, before starting the maneuver, the ML model has to be selected by the missile avoidance management subsystem 50 or the maneuver controlling subsystem 100, for example. The selected model 112 will guide the aircraft and control the deployment of countermeasures during the entire avoidance maneuver as long as no issue is identified by the ML monitoring subsystem 70 (e.g., if the ML model inputs are inside of the ODD and if the outputs are within its performance range).

In order to calculate the required control commands for the avoidance maneuver, the maneuver controlling subsystem 100 receives the relevant data (e.g., aircraft states, missile and countermeasures data), pre-process them in the pre-processing unit 111 (e.g., normalize the values) and send them as input to the ML models 112. The commands which are the output of the ML models 112 might need to be processed by a post-processing unit 113 to de-normalize the values. In the sequence, the output of the selected ML model is sent to the FCS and optionally to the system responsible for the countermeasures deployment.

While the aircraft is performing the maneuver, the ML data recording subsystem 60 is recording the ML model inputs and outputs in a defined frequency. Additionally, the ML monitoring subsystem 70 is checking if the inputs are within the operational boundaries and if the outputs are within the performance boundaries. In case the inputs and outputs are not within its respective boundaries, the missile avoidance management subsystem 50 will stop the maneuver and trigger a warning message (e.g., to a warning system 55).

The AI-based missile avoidance system will generate commands to the flight control system 90 and control the deployment of countermeasures only during the missile avoidance maneuver.

The ML monitoring subsystem 70 and the ML data recording subsystem 60 are optional, in one example.

The information about other aircraft as input to the ML model can be relevant and required due to two different aspects: collision avoidance with other aircraft while doing the missile avoidance maneuver and cooperation with other aircraft to perform multi-agent missile avoidance. For instance, two unmanned and one manned aircraft could maneuver in such a way that the probability of survival of the manned aircraft is maximized.

Figure 3:
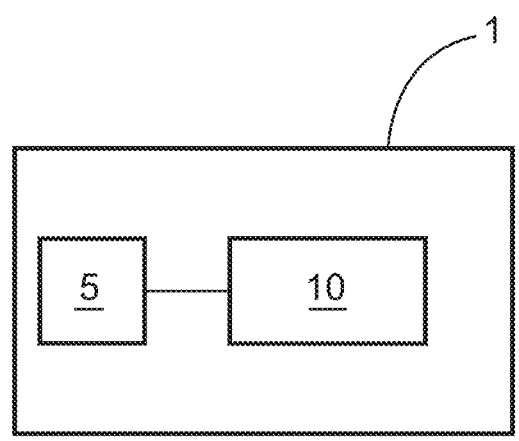
FIG. 3 is a schematic representation of an aircraft with a vehicle management system of FIG. 1.

FIG. 3 schematically shows a vehicle 1, in this example an aircraft, with a vehicle management system 10 as described with reference to FIGS. 1 and 2. The vehicle 1 further comprises a sensor arrangement 5 with one or multiple sensors for detecting the surroundings of the vehicle 1.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It will be understood that various changes may be made in the function and arrangement of elements described in an exemplary embodiment without departing from the scope of the claims.

Additionally, it is noted that "comprising" or "including" does not exclude any other elements or steps and "a" or "an" does not exclude a multitude or plurality. It is further noted that features or steps which are described with reference to one of the above exemplary embodiments may also be used

LIST OF REFERENCE SIGNS 1 aircraft
5 sensor arrangement
10 vehicle management system
11 missile avoidance system
16 countermeasure data
17 missile data
18 other vehicle states
19 sensor data
20 vehicle state provisioning unit
30 information collection unit
40 sensor input provisioning unit
50 missile avoidance management unit
52 availability status
55 warning system
60 data recording unit
70 monitoring unit
78 input monitoring
79 output monitoring
90 flight control system
91 command signals
100 maneuver control unit
104 countermeasure deployment trigger
110 first control model
111 pre-processing unit
112 machine learning model
113 post-processing unit
120 second control model
130 control model selection unit

The invention claimed is:

1. A vehicle management system for controlling at least one function of a vehicle, the vehicle management system comprising:
   a missile avoidance system, configured for generating a command for controlling the at least one function of the vehicle;
   wherein the missile avoidance system (11) comprises:
      a maneuver control unit; and
      a missile avoidance management unit;
      wherein the maneuver control unit comprises at least two control models, namely a first control model and a second control model;
      wherein each of the at least two control models is configured for generating the command for controlling the at least one function of the vehicle, and each of the at least two control models can be selectively put in an active state or an inactive state;
      wherein the missile avoidance management unit is configured for selecting one of the at least two control models and putting it in the active state; and
      wherein the maneuver control unit is configured to output the command for controlling the at least one function of the vehicle provided by the control model that is in the active state.

2. The vehicle management system of claim 1,
wherein the missile avoidance management unit is configured for selecting the one of the at least two control models and putting it in the active state based on input data including at least one or all of sensor data indicative of a state of the vehicle, missile data indicative of a missile approaching the vehicle, other vehicle state data indicative of a state of third vehicles in the surroundings of the vehicle.

3. The vehicle management system of claim 1,
wherein each control model of the at least two control models is a machine learning model configured for different use cases.

4. The vehicle management system of claim 3,
wherein each control model of the at least two control models is trained based on different operating conditions of the vehicle.

5. The vehicle management system of claim 4,
wherein the operating conditions are defined by at least one of weather conditions, altitude ranges of the vehicle, maneuver capabilities of the vehicle, missile types, available countermeasures of the vehicle, and/or speed ranges of the vehicle.

6. The vehicle management system of claim 1,
wherein the command for controlling the at least one function of the vehicle is a command for controlling movement of the vehicle and/or a countermeasure deployment trigger.

7. The vehicle management system of claim 1,
wherein at least one of the at least two control models includes more than one neural network, each of the neural networks being configured to generate commands for controlling different functions of the vehicle.

8. The vehicle management system of claim 2, further comprising a monitoring unit,
wherein the monitoring unit is configured to monitor the input data and determine if the selected one of the at least two control models fits to the input data.

9. The vehicle management system of claim 1, further comprising a data recording unit,
wherein the data recording unit is configured to record input data provided to the maneuver control unit, and output data provided by the maneuver control unit.

10. An aircraft comprising a vehicle management system of claim 1.

11. The aircraft of claim 10, further comprising at least one sensor arrangement,
wherein the sensor arrangement is communicatively coupled to the vehicle management system and configured to provide sensor data.

* * * * *